US010018721B2

(12) United States Patent
Schoonmaker et al.

(10) Patent No.: US 10,018,721 B2
(45) Date of Patent: Jul. 10, 2018

(54) RUGGEDIZED PACKAGING FOR LINEAR DISTANCE MEASUREMENT SENSORS

(71) Applicant: Manitowoc Crane Companies, LLC, Manitowoc, WI (US)

(72) Inventors: Stephen J. Schoonmaker, Chambersburg, PA (US); Martin R. Stander, Greencastle, PA (US)

(73) Assignee: MANITOWOC CRANE COMPANIES, LLC, Manitowoc, WI (US)

( * ) Notice: Subject to any disclaimer, the term of this patent is extended or adjusted under 35 U.S.C. 154(b) by 58 days.

(21) Appl. No.: 15/045,903

(22) Filed: Feb. 17, 2016

(65) Prior Publication Data
US 2016/0245917 A1 Aug. 25, 2016

Related U.S. Application Data

(60) Provisional application No. 62/118,183, filed on Feb. 19, 2015.

(51) Int. Cl.
*G01S 17/08* (2006.01)
*G01S 7/481* (2006.01)
*B66C 23/80* (2006.01)
*B66C 23/88* (2006.01)
*B66C 13/46* (2006.01)
*B66C 23/78* (2006.01)

(52) U.S. Cl.
CPC .............. *G01S 17/08* (2013.01); *B66C 13/46* (2013.01); *B66C 23/80* (2013.01); *B66C 23/88* (2013.01); *G01S 7/4813* (2013.01); *B66C 23/78* (2013.01)

(58) Field of Classification Search
CPC ........ G01S 17/08; G01S 7/4813; B66C 23/78; B66C 13/46; B66C 23/80; B66C 23/88
USPC ................... 33/706–708, 1 M; 187/222, 227
See application file for complete search history.

(56) References Cited

U.S. PATENT DOCUMENTS

| 4,598,797 | A | * | 7/1986 | Schultz | B66F 17/003 180/271 |
|---|---|---|---|---|---|
| 5,011,358 | A | * | 4/1991 | Andersen | B66F 9/0755 187/222 |
| 5,174,415 | A | * | 12/1992 | Neagle | B66F 9/07563 180/209 |
| 5,208,753 | A | * | 5/1993 | Acuff | B66F 9/0755 414/633 |
| 5,238,086 | A | * | 8/1993 | Aoki | B66F 9/20 187/223 |
| 5,749,696 | A | * | 5/1998 | Johnson | B66F 9/082 187/393 |
| 6,269,913 | B1 | * | 8/2001 | Kollmannsberger | B66F 9/0755 187/222 |
| 7,183,533 | B2 | * | 2/2007 | Osako | G01D 5/26 187/317 |

(Continued)

*Primary Examiner* — R. A. Smith
*Assistant Examiner* — Tania Courson
(74) *Attorney, Agent, or Firm* — Levenfeld Pearlstein, LLC

(57) ABSTRACT

A ruggedized packaging assembly for a linearly extending crane component measurement device includes an outer sleeve, an inner member slidably disposed in the outer sleeve, a target coupled to at least one of the outer sleeve and the inner sleeve, and a non-contact measurement instrument. Either the outer sleeve or the inner member is coupled to a linearly extending component, and the other part is coupled to a component from which a distance is being measured.

21 Claims, 6 Drawing Sheets

(56) References Cited

U.S. PATENT DOCUMENTS

| | | | | |
|---|---|---|---|---|
| 7,287,625 | B1* | 10/2007 | Harris | B66F 9/0755 187/237 |
| 8,763,759 | B2* | 7/2014 | Viereck | B66F 9/0755 187/222 |
| 8,915,020 | B2* | 12/2014 | Sauter | E06B 7/2318 187/400 |
| 9,199,828 | B2* | 12/2015 | Steinich | B66C 23/78 |
| 9,511,985 | B2* | 12/2016 | Haemmerl | B66F 9/0755 |
| 2009/0101447 | A1* | 4/2009 | Durham | B66F 9/0755 187/238 |
| 2017/0217737 | A1* | 8/2017 | Rudy | G06T 7/246 |

\* cited by examiner

RUGGEDIZED PACKAGING FOR LINEAR DISTANCE MEASUREMENT SENSORS

RELATED APPLICATIONS

The present patent document claims the benefit of the filing date under 35 U.S.C. § 119(e) of Provisional U.S. Patent Application Ser. No. 62/118,183, filed Feb. 19, 2015, which is hereby incorporated by reference.

TECHNICAL FIELD

The disclosed subject matter relates to systems and methods for measuring a linear distance in a harsh environment. More particularly the disclosed subject matter is directed to durable packaging for a linear measurement system.

BACKGROUND

Modern construction equipment contains multiple components that are actuated to move. For example, a crane might include a rotating bed having a boom, the boom might pivot vertically and extend longitudinally, and at least one outrigger may extend from the cab horizontally and engage the ground vertically. Each of these components is typically controlled by an operator during use of the equipment.

In recent years safety concerns have become paramount in the industry. For example, recent crane regulations require the use of Outrigger Monitoring Systems (OMS). Such a system may be used to measure the length of an outrigger to determine crane stability. Traditionally, the measurement of extension of an outrigger has been done using various physical sensors such as string potentiometers, magnetic sensors, and limit switches. These different sensors each have limitations that limit their use. String potentiometers, while potentially having acceptable measurement resolution, are susceptible to breakage and infiltration by particulates. Magnetic sensors are generally durable, but generally do not have the resolution required. Limit switches are subject to mechanical failure and are only able to measure discrete distances.

An optical measurement system has been proposed for measuring lengths, but it has its own drawbacks as well. For example, while an optical measurement system is potentially very accurate and not susceptible to mechanical failure, it is susceptible to dirt obscuring the sensor or airborne particulates disrupting the beam. For these reasons, optical measurement systems have been unsuccessful for extended use in construction equipment.

It would be beneficial to have a system and method for measuring a linear distance in a harsh environment that has the advantages of being accurate, not susceptible to mechanical wear, and not susceptible to interference from debris.

BRIEF SUMMARY

In one aspect, a ruggedized measurement system for a linearly extending crane component is disclosed that includes an optical distance sensor, a target, an outer sleeve, and an inner member. The target is in a line of sight with the optical distance sensor. The outer sleeve has a first end coupled to one of the optical distance sensor and the target, and the inner member is slidably disposed in the outer sleeve with the inner member being coupled to the other one of the optical distance sensor and the target.

In some embodiments, the outer sleeve has an open end and the inner member extends beyond the open end.

In some embodiments, there is a seal between the inner member and the outer sleeve. In some embodiments, the inner surface of the outer sleeve, an end of the inner member, and the seal define an enclosed cavity, and the seal is airtight. In some embodiments, the enclosed cavity is devoid of ambient air. In some embodiments, the enclosed cavity contains an inert gas.

In some embodiments, the outer sleeve has a hole disposed on a lower side, and the hole provides fluid communication through the lower side. In some embodiments, a desiccant is disposed in the outer sleeve. In some embodiments, a check valve is disposed in the hole.

In some embodiments, the inner member has a shaft extending out an end of the sleeve and there is a seal between the shaft and the end of the outer sleeve.

In some embodiments, the optical sensor is coupled to the outer sleeve and the target is disposed on the inner member.

In another aspect, an extendable crane component is disclosed that has a first structure, a second structure extendable from the first structure, and a ruggedized measurement system. The measurement system includes an outer sleeve attached to one of the first structure and the second structure, an inner member slidably disposed in the outer sleeve and attached to the other of the first structure and the second structure, a target coupled to at one of the outer sleeve and the inner member; and an optical sensor disposed on the other of the outer sleeve and the inner member.

In some embodiments, the optical distance sensor is coupled to the outer sleeve at a first end, the outer sleeve has an open second end opposite the optical distance sensor, and the inner member extends beyond the open second end.

In some embodiments, a seal is disposed between the inner member and the outer sleeve. In some embodiments, the inner surface of the outer sleeve, an end of the inner member, and the seal define an enclosed cavity, and the seal is airtight. In some embodiments, the enclosed cavity is devoid of ambient air. In some embodiments, the enclosed cavity contains an inert gas.

In some embodiments, the outer sleeve has a hole disposed on a lower side providing fluid communication through the lower side. In some embodiments, a desiccant is disposed in the outer sleeve. In some embodiments, a check valve is disposed in the hole.

In some embodiments, the inner member has a shaft extending out a second end of the outer sleeve and the system further includes a seal between the shaft and the second end of the outer sleeve.

DETAILED DESCRIPTION

In the following passages, different aspects of the disclosed subject matter are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Figure 1:
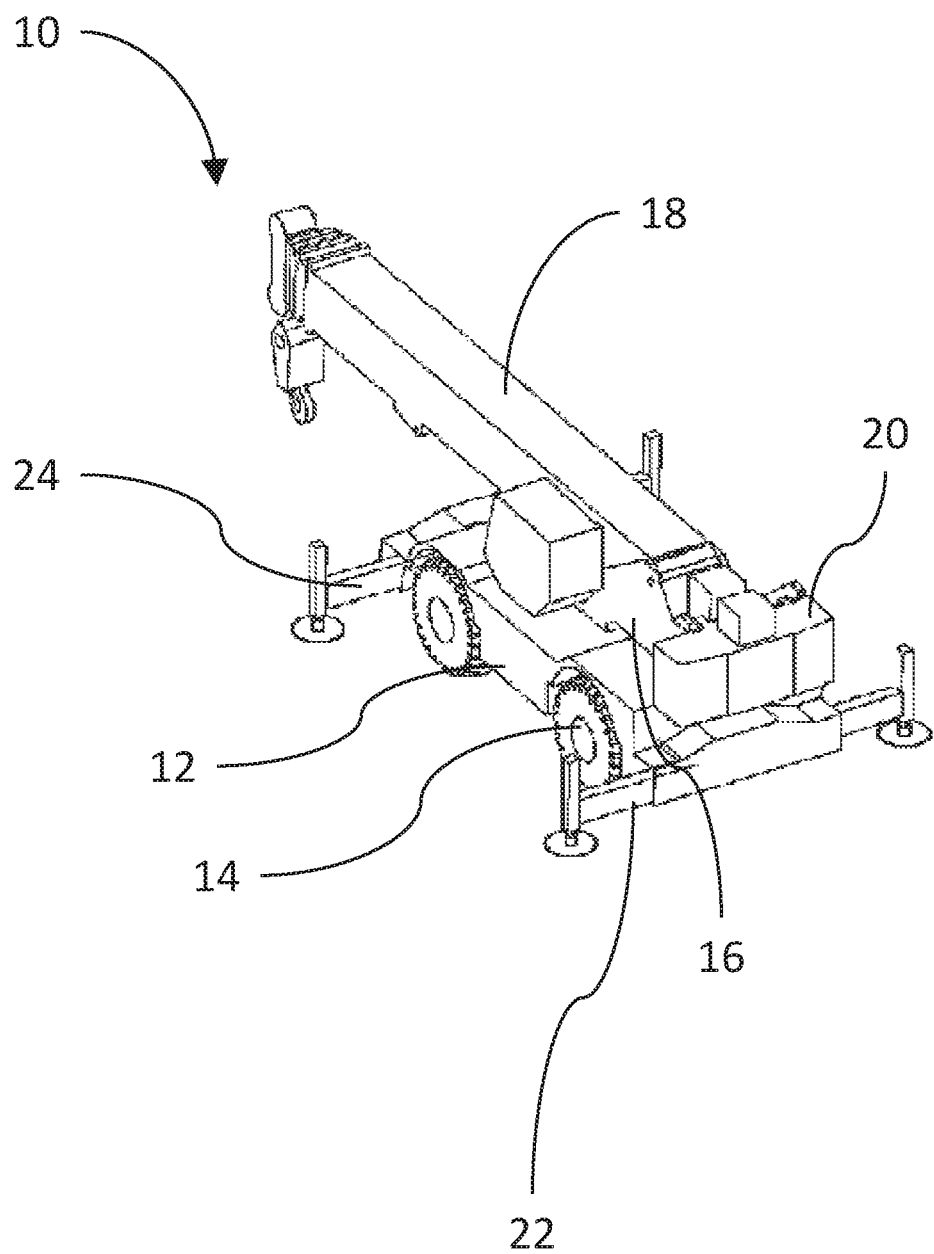
FIG. 1 illustrates a perspective view of an embodiment of a crane.

While the disclosed subject matter will have applicability to many types of cranes, it will be described in connection with a mobile crane 10, shown in an operational configuration with outriggers extended in FIG. 1. The mobile lift crane 10 includes a superstructure 16 disposed on a transportable chassis or carrier unit 12, which is supported by moveable ground engaging members in the form of tires 14. Of course tire configurations other than those shown may be used, as well as other types of ground engaging members, such as crawler tracks. The superstructure 16 supports a boom 18 pivotally mounted on the superstructure 16 and a counterweight unit 20. The boom 18 may be a telescoping boom as shown in FIG. 1. The counterweight unit 20 may be in the form of multiple stacks of individual counterweight members.

The carrier unit 12 allows the mobile crane 10 to maneuver over land to a desired location for lifting tasks. However, once the mobile crane 10 is positioned at a location to perform lifting tasks, as tires often do not provide adequate support for lifting loads, an outrigger system is provided for stabilizing the crane 10 during lifting operations. The outrigger system is most often provided as part of the carrier unit 12. In the example illustrated in FIG. 1, the crane 10 has a front and rear set of outriggers identified as 22 and 24, respectively. In some cases, outrigger beams may be transported separately from the carrier unit 12 and attached to the mobile crane 10 at the job site. Appropriate controls for the outriggers are normally provided on the carrier unit 12 for operation by an individual standing near the mobile crane, in the operator's cab, or both.

The outriggers 22, 24 are retractable, such that they may be retracted towards the carrier unit 12 when not in use to allow for increased mobility. While the stability of the mobile crane 10 is generally greatest with the outriggers 22, 24 in the fully extended position shown in FIG. 1, the mobile crane 10 may be operated with the outriggers in a position between the fully extended and retracted positions. Because the stability of the mobile crane 10 is dependent on the amount of extension of the outriggers, it is beneficial to be able to accurately determine the position of the outriggers.

Each outrigger may have a jack that extends vertically downward from the outrigger. The jacks are able to compensate for variation in the terrain in which the mobile crane is operating and to level the mobile crane. In some embodiments, the mobile crane includes sensors to monitor if the jacks are deployed and a level to ensure that the crane is level. One example of a sensor for monitoring the jacks is a pressure sensor that determines the weight on a jack. In operation, the mobile crane may be supported entirely on the jacks.

The boom 18 may be a telescoping boom. Like the outriggers, the stability and load lifting capability of the mobile crane 10 is dependent on the length the boom 18 is extended to. Because a load moment of the boom 10 is the product of the load multiplied by the horizontal distance between the crane and the load, a longer boom 18 results in a larger load moment. An accurate determination of the length of the boom 18 may be necessary to accurately determine the load moment of a mobile crane in operation.

Together, the outriggers 22, 24, jacks, and boom 18, each comprising a first structure and a second structure extendable relative to the first structure, make up the most common linearly extending elements of a mobile crane. To facilitate modern control systems, it is important that the extension of these components be measured accurately in a robust fashion. Other elements of a mobile crane may require robust measurement systems and embodiments of the invention are not limited to the described systems. Furthermore, an exemplary measuring device having a ruggedized housing will now be described in relation to the outriggers of a mobile crane, but embodiments are not so limited. One of ordinary skill in the art will recognize that the described embodiments are applicable to most any mobile crane component in which a robust, linear distance measurement is required.

Figure 2:
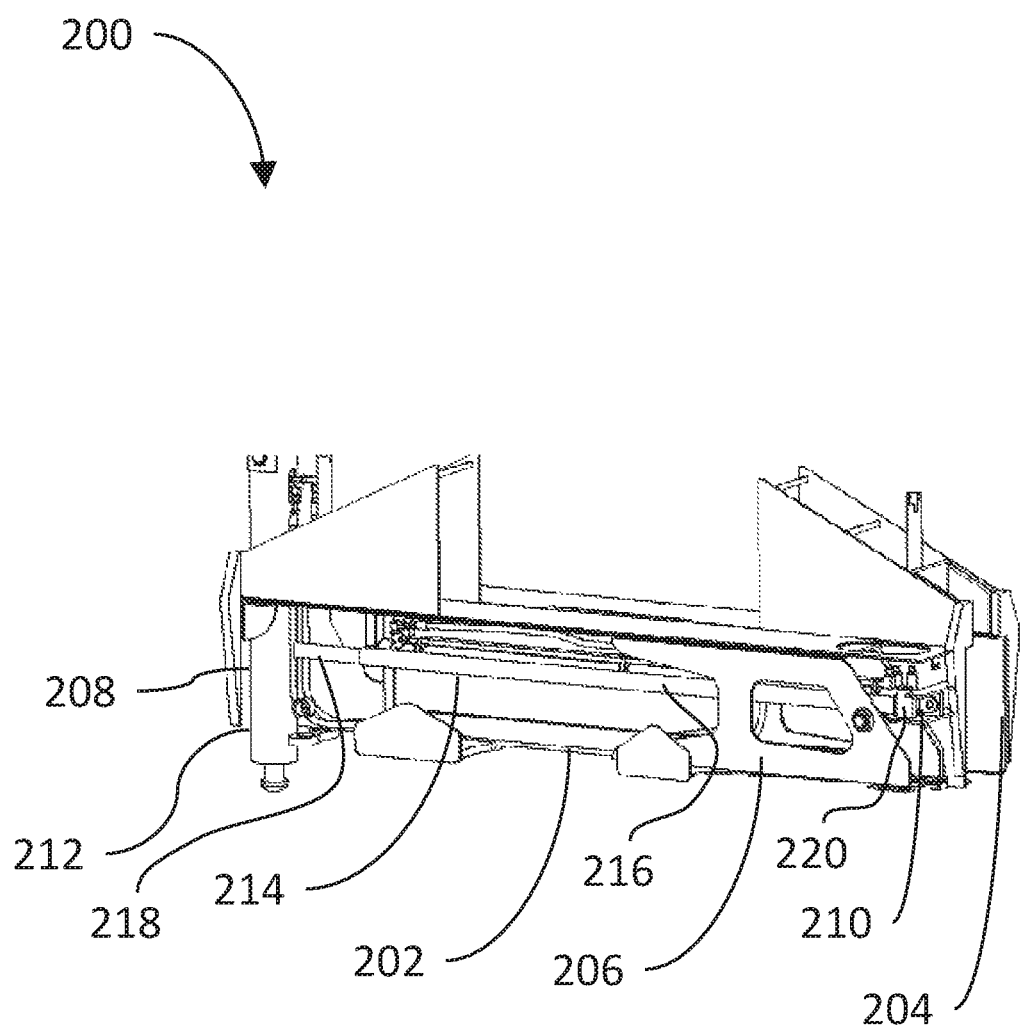
FIG. 2 illustrates a perspective view of an outrigger assembly in a retracted state.

FIG. 2 illustrates a detailed view of an outrigger assembly 200, suitable for use with the mobile crane of FIG. 1. The outrigger assembly 200 is shown without any accompanying structure such as carrier unit 12 for clarity. The outrigger assembly 200 would normally be coupled to a structure such as the carrier unit 12 using techniques commonly known in the art such as bolted connections, welded connection, or other connection types.

The outrigger assembly 200 includes a left outrigger 202 and a right outrigger 204. The left outrigger 202 is shown cut away so that the inside of the outrigger 202 is visible. The left outrigger 202 includes an outer portion 206, or first structure, and an inner portion 208, or second structure, slidably disposed within the outer portion 206. The outer portion 206 is coupled to a structure such as the carrier unit 12. A linear actuation mechanism, such as a hydraulic cylinder 210, is coupled at one end to the outer portion 206, and is coupled to the inner portion 208 at an opposite end. Movement of the two ends of the linear actuation mechanism 210 causes the inner portion 208 of the outrigger 202 to move relative to the outer portion 206, thereby extending and retracting the outrigger 202. At a far end of the outrigger 202, a jack assembly 212 is disposed. The jack assembly 212 has a foot that is extendable for contacting the ground to support the mobile crane. The jack assembly 212 may have a linear actuator in the form of another hydraulic cylinder. This exemplary outrigger 202 is presented only as one representative embodiment of an outrigger. One of ordinary skill in the art will recognize that an outrigger could have more than two portions, that it could be actuated to extend using a different linear actuator, and that the linear actuator need not be coupled to the inner and outer portions of the outrigger.

Within the outrigger 202 is a ruggedized measurement assembly 214. As will be shown in greater detail in the following figures, the ruggedized measurement assembly 214 includes an outer sleeve 216, an inner member 218 slidably disposed within the outer sleeve 216, a target (not shown), and a non-contact measuring device such as an optical distance sensor 220. In some embodiments, the optical distance sensor 220 is a laser distance measurement sensor as known in the art.

Figure 3:
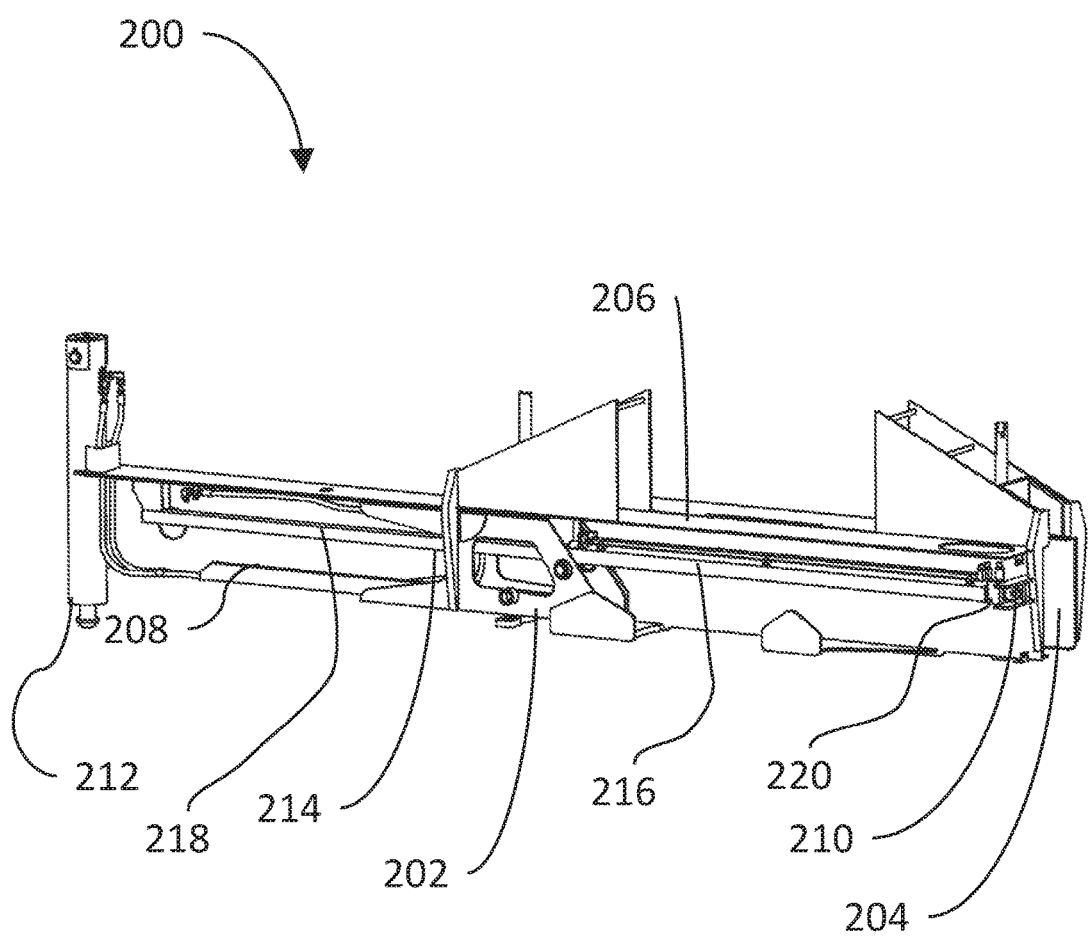
FIG. 3 illustrates a perspective view of the outrigger assembly of FIG. 2 in an extended state.

FIG. 3 illustrates the ruggedized outrigger assembly of FIG. 2, but in an extended configuration. As can be seen in FIG. 2, as the outrigger 202 extends, the inner portion 218 extends from the outer portion 206. Because the ruggedized measurement assembly 214 is connected to the outer portion 206 at one end, and to the inner portion 208 at the other end, extension of the outrigger 202 causes the ruggedized measurement assembly to extend a proportional amount. By measuring the distance the inner member 218 extends relative to the outer member 216, the extension of the outrigger 202 extension may be determined.

Figure 4:
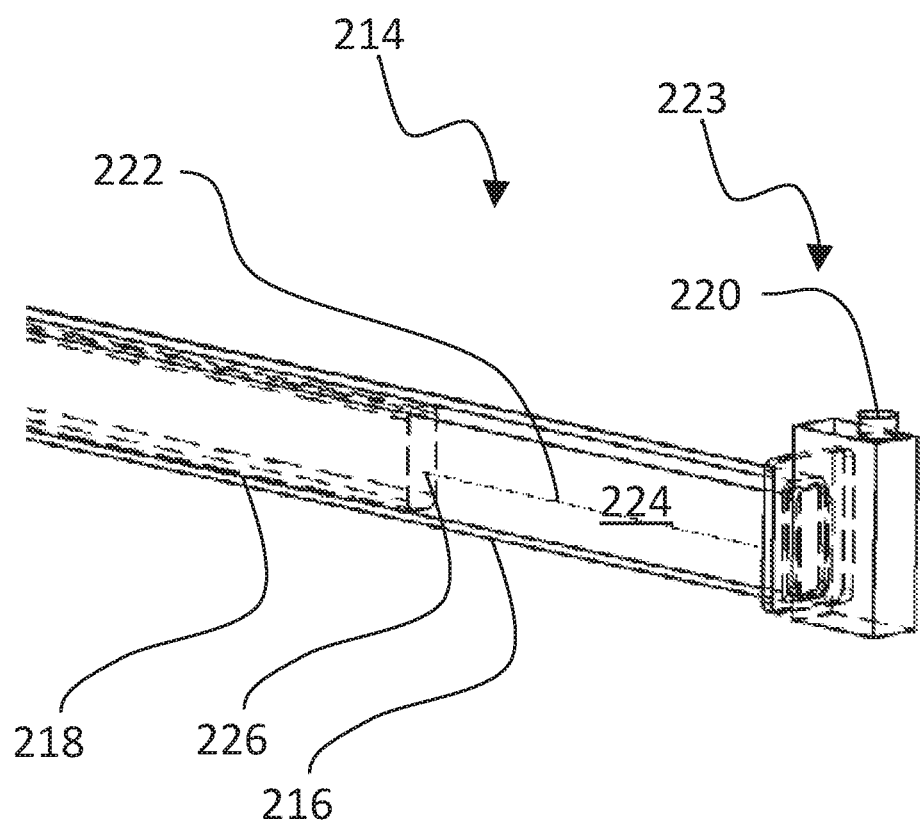
FIG. 4 illustrates a perspective view of a portion of the linear distance device having ruggedized packaging of FIG. 3.

FIG. 4 illustrates the ruggedized measurement assembly 214 of FIG. 2. The ruggedized measurement assembly 214 is shown without the surrounding components for clarity. The optical sensor 220 is a standard non-contact measurement device as is known in the art. It measures a distance between a reference point, such as the face of the laser, and a target 226. By affixing the target 226 to a moving piece of equipment, such as the inner portion 208 of the outrigger, the distance the equipment moves may be measured. In FIG. 4, the laser measurement device 220 is positioned at a first end 223 of the outer sleeve 216 with a laser beam, indicated by dashed line 222, orientated longitudinally within a cavity in the outer sleeve 216. The target 226 is configured to move with the inner member 218, which is coupled to the object being measured, such that the distance the inner member 218 moves, and thus the object being measured, may be determined by measuring the distance the target 226 moves. The target 226 may be a separate component attached to the inner member 218, or in some embodiments the target 218 may be an end of the inner member 218 itself.

Together, an inner surface of the outer sleeve 216, an end face of the inner member 218, and an end face of the outer sleeve 216 form an enclosed cavity 224. Because the cavity 224 is enclosed, infiltration by dust and debris is minimized. The only path into the enclosed cavity 224 is between inner member 218 and the outer sleeve 216. To further enhance the isolation of the enclosed cavity, a seal may be placed between the inner member 218 and the outer sleeve 216. The seal may be adapted to inhibit the transfer of fluid past the seal, while still allowing the inner member 218 to slide in and out of the enclosed cavity 224 of the outer sleeve 216. In some embodiments, multiple seals may be placed between the inner member 218 and the outer sleeve 216 to inhibit the transfer of air between the enclosed cavity 224 and the ambient atmosphere.

During movement of the target 226, the volume of the enclosed cavity 224 will change. If the enclosed cavity 224 is completely sealed, the pressure within the enclosed cavity 224 will vary with the changing volume. The trapped air may provide resistance to motion acting as a spring as the air is compressed. Additionally, when the enclosed cavity 224 is at is minimum volume, the compressed air may leak through the seals until the pressure is lowered. Then, when the enclosed cavity 224 is expanded with the extension of the outrigger, the pressure within the enclosed volume 224 may be lowered sufficient to draw in air, and potentially moisture and/or debris. When the pressure is increased again with the retraction of the outrigger, moisture within the air may condense at the higher pressure leading to moisture within the enclosed cavity 224.

To combat these potential problems, the seals may be regularly maintained to ensure that no fluid transfers between the enclosed cavity 224 and the ambient environment. However, this may lead to excessive maintenance and a point of potential failure. It may be possible to evacuate the enclosed cavity 224 so that it is devoid of ambient air, but this again would be dependent on the quality of the seal. In other embodiments, the enclosed cavity may be filled with a "dry" gas such as nitrogen, which would still require regular maintenance and high quality seals to inhibit ambient air from mixing with the fluid contained in the enclosed cavity.

Figure 5:
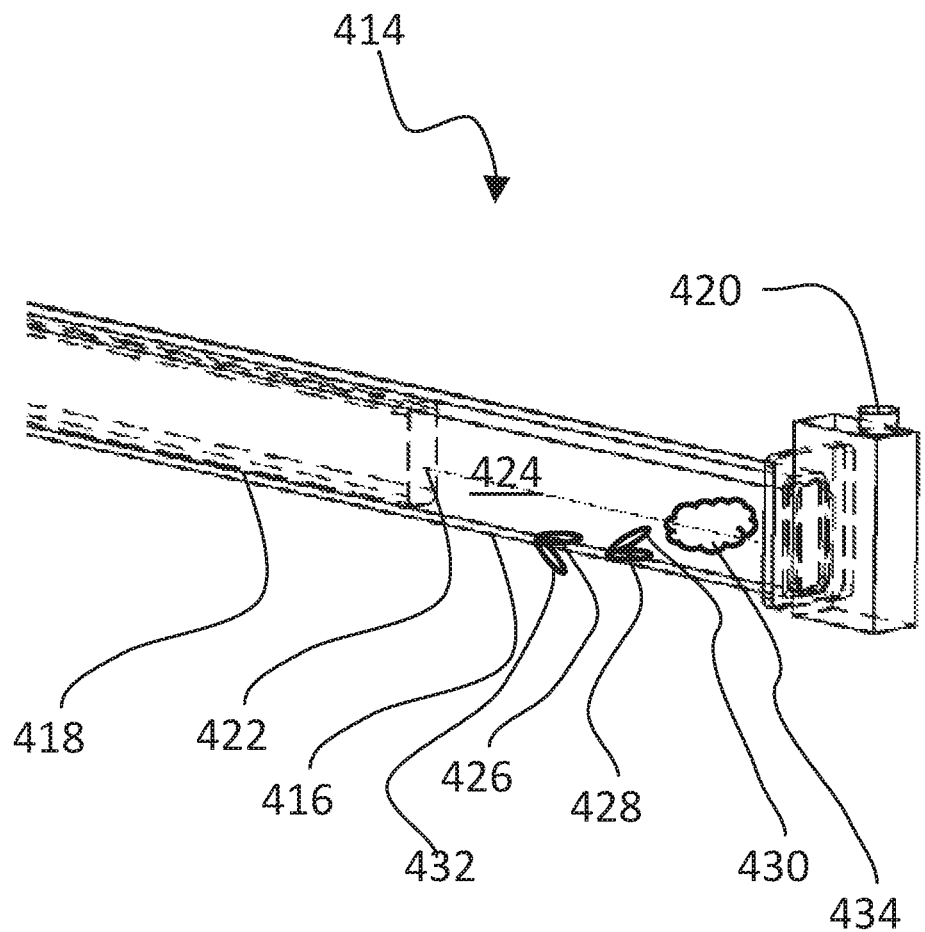
FIG. 5 illustrates a perspective view of a portion of another embodiment of a linear distance measurement device having ruggedized packaging.

FIG. 5 illustrates another embodiment of a ruggedized sensor assembly 414. This embodiment is substantially the same as the embodiment of FIG. 4, having an outer sleeve 416, and inner member 418, a target 422, and a laser measurement device 420 with the exception that it does not require an air tight seal between the enclosed cavity 424 and the ambient environment. In this embodiment, there are one or more vents 426, 428 disposed in a lower side of the outer sleeve 416 providing fluid communication between the enclosed cavity 424 and the ambient air. The one or more vents 426, 428 may have a filter element covering the vents 426, 428 to inhibit particulates from entering the enclosed cavity 424 through the vents 426, 428.

The vents 426, 428 may be equipped with a valve to selectively inhibit air from passing through the vents. For example, a valve may be configured to open only during movement of the outrigger to allow pressure to equalize, but be closed when the outrigger is at rest, to inhibit ambient air from entering the enclosed cavity 424 at rest. In some embodiment, a check valve or reed valve, may selectively inhibit the air from passing through the vents 426, 428. For example, a first check valve 430 may be configured to allow fluid into the enclosed cavity 424, but inhibit fluid from passing out, while a second check valve 432 may inhibit fluid from passing into the enclosed cavity 424 while allowing fluid to pass out of the enclosed cavity 424. Together, the two valves 430, 432 would allow fluid to pass in or out when there is a pressure differential between the enclosed cavity 424 and the ambient air, while inhibiting fluid from passing when there is no pressure differential. Additionally, in such embodiments, only the first valve 430 would require filtering, since fluid does not pass through the second valve 432 into the enclosed cavity 424.

In some embodiments, a desiccant 434 may be disposed within the enclosed cavity 424 to reduce the amount of moisture in the enclosed cavity 424. The desiccant 434 may be user accessible for servicing.

Figure 6:
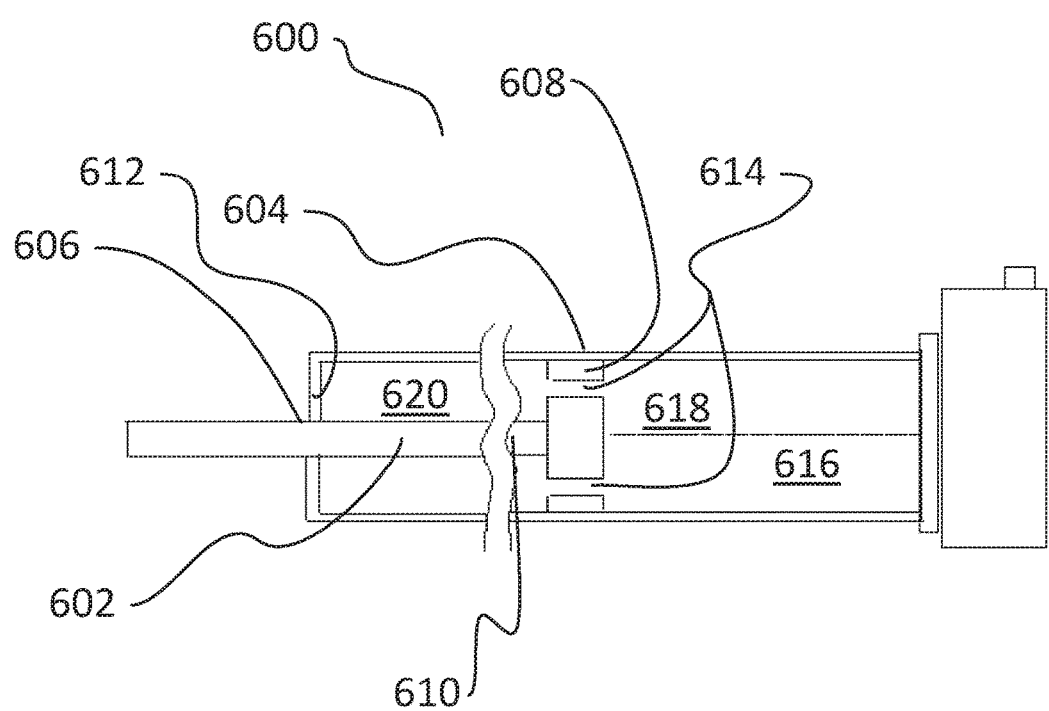
FIG. 6 illustrates a side view of a portion of another embodiment of a linear distance measurement device.

FIG. 6 illustrates another embodiment of a ruggedized sensor assembly system 600. This embodiment is similar to the embodiment of FIG. 4, with the exception of the location of the seal between the inner member 602 and the outer sleeve 604. In FIG. 4, the seal is disposed between an inner longitudinal surface of the outer sleeve 216 and an outer longitudinal surface of the inner member 218. In the embodiment of FIG. 6, the inner member 602 has a target body 608 disposed at an end of a shaft 610, and the seal 606 is between an outer surface of the shaft 610 and an end wall 612 of the outer sleeve 604. Vents 614 in the target body 608 allow fluid to pass through the target body 608 such that any difference in pressure on one either side of the target body 608 will be equalized by fluid passing through the vent 614.

The enclosed cavity 616 of the ruggedized measurement system of FIG. 6 is divided into a first inner volume 618 on a first side of the target body 608 and a second inner volume 620 on a second side of the target body 608. Movement of the target body 608 increase or decreases the relative volume of first inner volume 618 and the second inner volume 620, but the total inner volume 616 remains constant. Therefore, in this embodiment, any pressure change within the enclosed cavity 616 is minimal and no venting or other pressure relief modifications are necessary.

It should be understood that various changes and modifications to the presently preferred embodiments described herein will be apparent to those skilled in the art. For example, the laser measurement device could be coupled to the movement of the inner sleeve and the target could be placed on an end of the outer sleeve. Or in other embodiments, the outer sleeve may be coupled to the moving component, and the inner component may be coupled to the stationary component.

The invention claimed is:

1. A ruggedized measurement system for a linearly extending crane component, the measurement system comprising:
   an optical distance sensor;
   a target in a line of sight with the optical distance sensor;
   an outer sleeve having an inner surface and a first end coupled to one of the optical distance sensor and the target; and
   an inner member slidably disposed in the outer sleeve and having an end face, the inner member coupled to another one of the optical distance sensor and the target,
   wherein the optical distance sensor is positioned so that the line of sight extends within the outer sleeve between the first end and the end face.

2. The measurement system of claim 1, wherein the outer sleeve includes an open end and the inner member extends beyond the open end.

3. The measurement system of claim 1, further comprising a seal between the inner member and the outer sleeve.

4. The measurement system of claim 3, wherein the first end and inner surface of the outer sleeve and the end face of the inner member form an enclosed cavity, the seal seals the enclosed cavity, and the seal is airtight.

5. The measurement system of claim 4, wherein the enclosed cavity is devoid of ambient air.

6. The measurement system of claim 4, wherein the enclosed cavity contains an inert gas.

7. The measurement system of claim 1, wherein the outer sleeve includes a vent on a lower side thereof, the vent providing fluid communication through the lower side.

8. The measurement system of claim 7, further comprising a desiccant in the outer sleeve.

9. The measurement system of claim 7, further comprising a check valve in the vent.

10. The measurement system of claim 1, wherein the inner member includes a shaft extending out of an end of the outer sleeve and wherein the system further comprises a seal between the shaft and the end of the outer sleeve.

11. The measurement system of claim 1, wherein the optical distance sensor is coupled to the outer sleeve and the target resides on the inner member.

12. An extendable crane component comprising:
    a first structure;
    a second structure; and
    a ruggedized measurement system comprising:
    an outer sleeve attached to one of the first structure and the second structure;
    an inner member slidably disposed in the outer sleeve and attached to the other of the first structure and the second structure;
    a target coupled to one of the outer sleeve and the inner member; and
    an optical sensor disposed on an other of the outer sleeve and the inner member,
    wherein the optical sensor is positioned to have a line of sight extending within the outer sleeve, and the target is disposed in the line of sight.

13. The extendable crane component of claim 12, wherein the optical sensor is coupled to the outer sleeve at a first end and the outer sleeve has an open second end opposite the optical sensor and wherein the inner member extends beyond the open second end.

14. The extendable crane component of claim 12, further comprising a seal between the inner member and the outer sleeve.

15. The extendable crane component of claim 14, wherein an inner surface and a first end of the outer sleeve and an end of the inner member form an enclosed cavity, the seal seals the enclosed cavity, and the seal is airtight.

16. The extendable crane component of claim 15, wherein the enclosed cavity is devoid of ambient air.

17. The extendable crane component of claim 15, wherein the enclosed cavity contains an inert gas.

18. The extendable crane component of claim 12, wherein the outer sleeve has a vent on a lower side providing fluid communication through the lower side.

19. The extendable crane component of claim 18 further comprising a desiccant in the outer sleeve.

20. The extendable crane component of claim 18 further comprising a check valve in the vent.

21. The extendable crane component of claim 12, wherein the inner member has a shaft extending out a second end of the outer sleeve and wherein the system further comprises a seal between the shaft and the second end of the outer sleeve.

* * * * *